(12) United States Patent
Sung et al.

(10) Patent No.: US 12,555,879 B2
(45) Date of Patent: Feb. 17, 2026

(54) CYLINDRICAL SECONDARY BATTERY

(71) Applicant: Samsung SDI Co., Ltd., Yongin-si (KR)

(72) Inventors: Geon Kyu Sung, Yongin-si (KR); Dong Jin An, Yongin-si (KR); Ho Jae Lee, Yongin-si (KR); Hyun Ki Jung, Yongin-si (KR); Ye Jin Cho, Yongin-si (KR); Yeon Hwa Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 554 days.

(21) Appl. No.: 18/003,957

(22) PCT Filed: Mar. 25, 2022

(86) PCT No.: PCT/KR2022/004211
§ 371 (c)(1),
(2) Date: Dec. 30, 2022

(87) PCT Pub. No.: WO2022/215918
PCT Pub. Date: Oct. 13, 2022

(65) Prior Publication Data
US 2023/0261352 A1 Aug. 17, 2023

(30) Foreign Application Priority Data
Apr. 6, 2021 (KR) .................. 10-2021-0044577

(51) Int. Cl.
*H01M 50/595* (2021.01)
*H01M 50/107* (2021.01)
(Continued)

(52) U.S. Cl.
CPC ....... *H01M 50/595* (2021.01); *H01M 50/107* (2021.01); *H01M 50/152* (2021.01); *H01M 50/538* (2021.01)

(58) Field of Classification Search
CPC ................................................. H01M 50/595
See application file for complete search history.

(56) References Cited

U.S. PATENT DOCUMENTS

| 7,960,048 B2 | 6/2011 | Jang et al. |
| 2007/0154787 A1 | 7/2007 | Jang et al. |

(Continued)

FOREIGN PATENT DOCUMENTS

| JP | 2002-110222 A | 4/2002 |
| JP | 2003-168413 A | 6/2003 |

(Continued)

OTHER PUBLICATIONS

WO2019146905andtranslation (Year: 2019).*

(Continued)

*Primary Examiner* — Brian R Ohara
(74) *Attorney, Agent, or Firm* — Womble Bond Dickinson (US) LLP

(57) ABSTRACT

One embodiment of the present invention relates to a cylindrical secondary battery. The present invention comprises: an electrode assembly comprising a negative electrode plate, a positive electrode plate, and a separator interposed between the negative electrode plate and the positive electrode plate, and having a wound shape in one direction; a metallic finishing tape attached to the outer peripheral surface of the electrode assembly so as to cover at least a portion of the electrode assembly; a cylindrical can having one side opened so as to accommodate the electrode assembly along with an electrolyte; and a cap assembly coupled to the open one side of the can so as to seal the can. According to the present invention, by applying the metallic tape to a winding finishing portion of the electrode assembly, the effect is gained of improving the dispersion of quality of a substrate finishing structure, caused by the dispersion of a major axis. In addition, the metallic tape plays the role of an (Continued)

additional end tab (substrate tab), and thus the effect is gained of improving the dispersion of cell performance.

11 Claims, 9 Drawing Sheets

(51) Int. Cl.
    *H01M 50/152*     (2021.01)
    *H01M 50/538*     (2021.01)

(56) References Cited

U.S. PATENT DOCUMENTS

| | | | |
|---|---|---|---|
| 2010/0255357 A1 | 10/2010 | Baek et al. | |
| 2020/0076005 A1* | 3/2020 | Oki | H01M 10/0587 |
| 2021/0159573 A1 | 5/2021 | Kim et al. | |

FOREIGN PATENT DOCUMENTS

| | | | | |
|---|---|---|---|---|
| JP | 2003-173815 A | 6/2003 | | |
| JP | 2007-184238 A | 7/2007 | | |
| JP | 4931492 B2 | 5/2012 | | |
| JP | WO2018/105398 A | 6/2018 | | |
| KR | 10-2009-0105619 A | 10/2009 | | |
| KR | 10-2020-0062767 A | 6/2020 | | |
| WO | WO 2018/074773 A1 | 4/2018 | | |
| WO | WO-2019146905 A1 * | 8/2019 | | H01M 50/103 |

OTHER PUBLICATIONS

International Search Report for PCT Application No. PCT/KR2022/004211 dated Jun. 20, 2022, 3 pages.
Korean Office Action for KR Application No. 10-2021-0044577, dated Aug. 25, 2025, 6 pages.
Extended European Search Report issued in corresponding EP Application No. 22784828.0-1103, dated Sep. 9, 2025, 10 pages.

* cited by examiner

CYLINDRICAL SECONDARY BATTERY

CROSS-REFERENCE TO RELATED APPLICATIONS

This application is a U.S. National Phase Patent Application of International Application Number PCT/KR2022/004211, filed on Mar. 25, 2022, which claims priority to Korean Patent Application Number 10-2021-0044577, filed on Apr. 6, 2021, the entire content of each of which is incorporated herein by reference.

TECHNICAL FIELD

An embodiment of the present invention relates to a cylindrical secondary battery capable of improving the dispersion of cell performance.

BACKGROUND ART

In general, a cylindrical secondary battery includes a cylindrical electrode assembly, a cylindrical can accommodating the electrode assembly and electrolyte, and a cap assembly coupled to a top opening of the can to seal the can and allow current generated in the electrode assembly to flow to an external device. Specifically, the electrode assembly is formed by winding a negative electrode substrate and a positive electrode substrate into a cylindrical shape, and attaching a tape or the like to prevent the wound end from unwinding.

Recently, in accordance with the demand for high-output and high-capacity batteries, the need to efficiently design the inner space of a cylindrical can has emerged. Accordingly, it is necessary to improve the finishing structure of a substrate.

The above information disclosed in this Background section is only for enhancement of understanding of the background of the invention and therefore it may contain information that does not constitute prior art.

DESCRIPTION OF EMBODIMENTS

Technical Problem

An object of the present invention is to provide a cylindrical secondary battery capable of improving the dispersion of cell performance.

Solution to Problem

A cylindrical secondary battery according to an embodiment of the present invention may include: an electrode assembly comprising a negative electrode plate, a positive electrode plate, and a separator interposed between the negative electrode plate and the positive electrode plate, and having a wound shape in one direction; a metallic finishing tape attached to the outer peripheral surface of the electrode assembly so as to cover at least a portion of the electrode assembly; a cylindrical can having one side opened so as to accommodate the electrode assembly along with an electrolyte; and a cap assembly coupled to the open one side of the can so as to seal the can.

The finishing tape may include a metallic region contacting one side of an inner peripheral surface of the can and an adhesive region formed on the metallic region and attached to the electrode assembly.

The adhesive region may be repeatedly formed on the metallic region to have a preset shape and spacing.

The adhesive region may include at least one of a vertical line, a horizontal line, a lattice, and a dot shape.

The finishing tape may be attached to at least a part of an outer end of the electrode assembly, which is a winding finishing portion.

On the basis of the direction of the winding axis of the electrode assembly, the length (L2) of the finishing tape may be 10 to 100% of the length (L1) of the electrode assembly.

The finishing tape may include a plurality of finishing tapes.

Advantageous Effects of Disclosure

According to an embodiment of the present invention, by applying the metallic tape to the winding finishing portion of the electrode assembly, there is an effect of improving quality distribution of the substrate finishing structure due to dispersion of a major axis. In addition, the metallic tape serves as an additional end tab (substrate tab) to improve cell performance distribution.

BEST MODE

Figure 1:
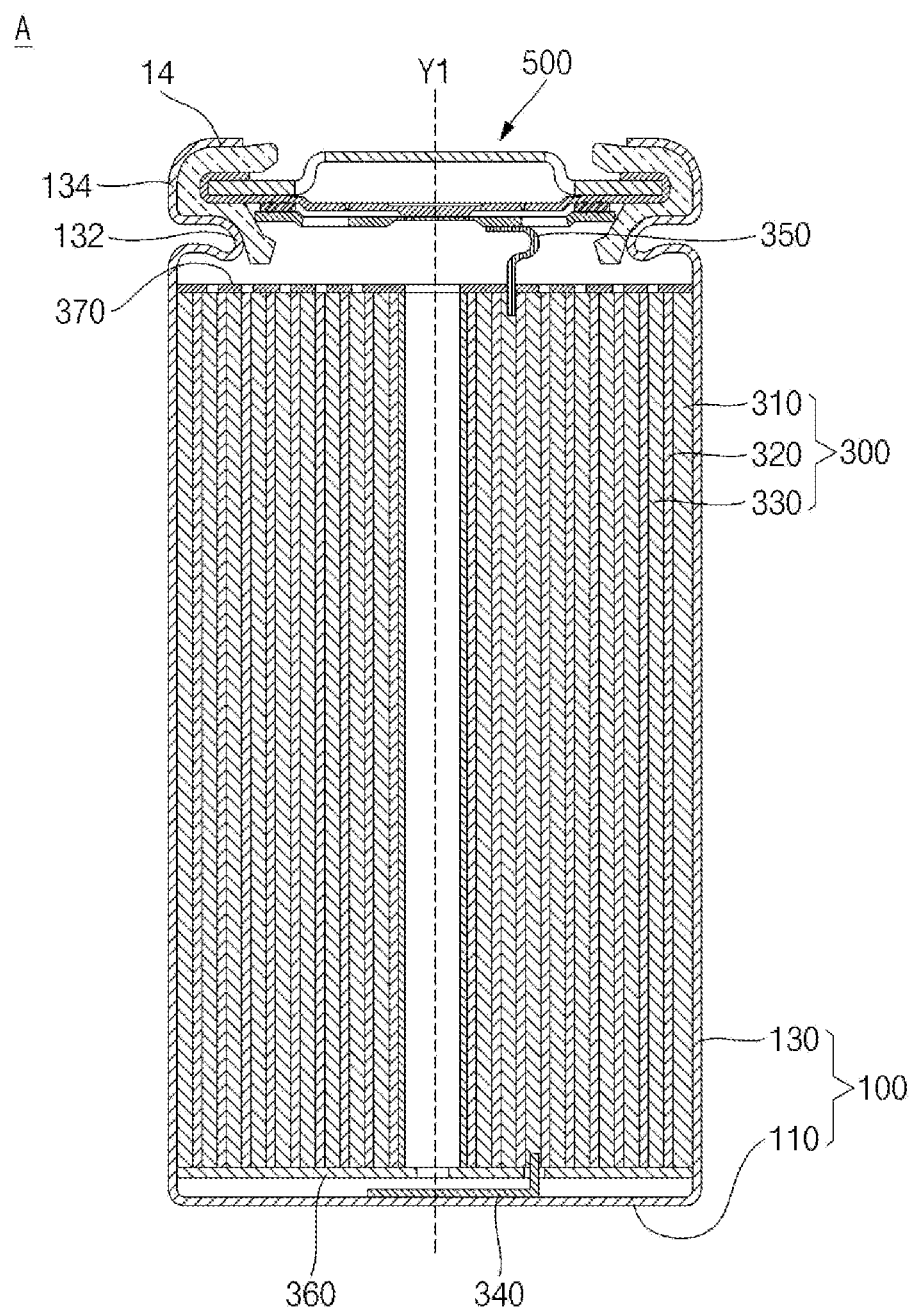
FIG. 1 is a longitudinal cross-sectional view illustrating a general cylindrical secondary battery.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity, and like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, a cylindrical secondary battery according to an embodiment of the present invention will be described in detail with reference to the accompanying drawings.

FIG. 1 is a longitudinal cross-sectional view illustrating a general cylindrical secondary battery.

As shown in FIG. 1, a general cylindrical secondary battery 10 may include a cylindrical can 100 having an opening formed at one end in the longitudinal direction, an electrode assembly 300 accommodated inside the can, and a cap assembly 500 inserted into the opening.

The can 100 includes a circular bottom portion 110 and a side portion 130 extending upward from the bottom portion 110, and the upper portion of the side portion 130 is open (hereinafter referred to as an opening). In the manufacturing process of the secondary battery B, the electrode assembly 300 is inserted into the can 100 together with the electrolyte solution through the opening of the can 100. The can 100 may be made of steel, a steel alloy, nickel-plated steel, a nickel-plated steel alloy, aluminum, an aluminum alloy, or an equivalent thereof, but the material is not limited thereto.

The cap assembly 500 is inserted into the opening of the can 100. A separation preventing structure may be formed on the top of the can 100 to prevent the inserted cap assembly 500 from escaping to the outside through the opening of the can 100. For example, the separation preventing structure may be a beading part 132 and a crimping part 134.

The electrode assembly 300 includes a negative electrode plate 310 coated with an electrode active material (e.g., graphite, carbon, etc.) on a negative electrode substrate (anode uncoated portion), a positive electrode plate 320 coated with a positive electrode active material (e.g., a transition metal oxide (LiCoO2, LiNiO2, LiMn2O4, etc.), and a separator 330 disposed between the negative electrode plate 310 and the positive electrode plate 320 to prevent a short circuit and allow only the movement of lithium ions. After being wound in a substantially cylindrical shape, the negative electrode plate 310, the positive electrode plate 320, and the separator 330 may be fixed with a finishing tape (see FIG. 2, to be described later) to maintain a wound state. In this state, the electrode assembly 300 may be accommodated inside the can 100.

The negative electrode substrate of the negative electrode plate 310 may be copper (Cu) or nickel (Ni) foil, the positive electrode substrate of the positive electrode plate 320 may be aluminum (Al) foil, the separator 330 may be polyethylene (PE) or polypropylene (PP), but the above materials are not limited in the present invention. The negative electrode tab 340 protruding downward by a certain length may be welded on the negative electrode plate 310, and the positive electrode tab 350 protruding downward by a certain length may be welded on the positive electrode plate 320, but the reverse is also possible. The negative electrode tab 340 may be made of copper or nickel, and the positive electrode tab 350 may be made of aluminum, but the above materials are not limited in the present invention. The negative electrode tab 340 may be welded to the bottom portion 110 of the can 100, and in this case, the can 100 may operate as a negative electrode. Conversely, the positive electrode tab 350 may be welded to the bottom portion 110 of the can 100, and in this case, the can 100 may operate as a positive electrode.

In addition, a first insulating plate 360 and a second insulating plate 370 may be interposed above and below the electrode assembly 300. The first insulating plate 360 prevents the positive electrode plate 320 from electrically contacting the bottom portion 110 of the can 100, and the second insulating plate 370 prevents the negative electrode plate 310 from electrically contacting the cap assembly 500.

Meanwhile, the finishing tape 400 is attached to the wound end of the electrode assembly 300 so as not to unwind while the electrode assembly 300 is wound.

Figure 2:
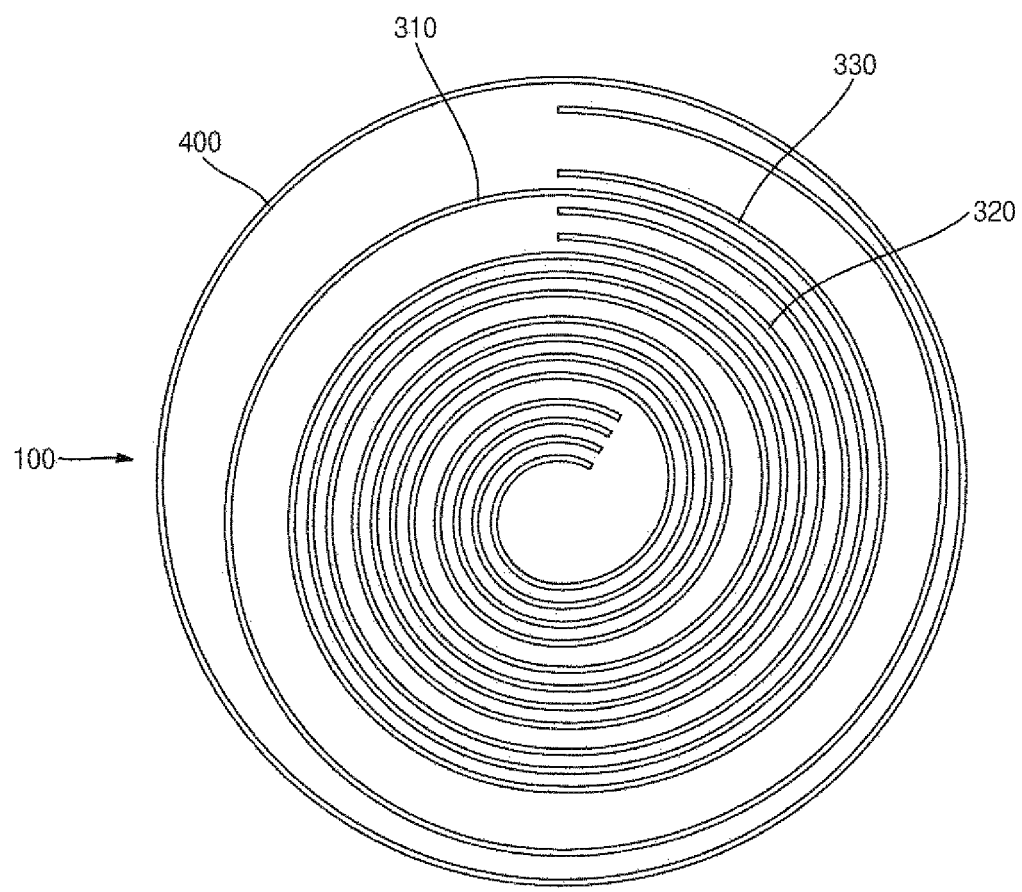
FIG. 2 is a plan view schematically illustrating an electrode assembly according to an embodiment of the present invention.
Figure 3:
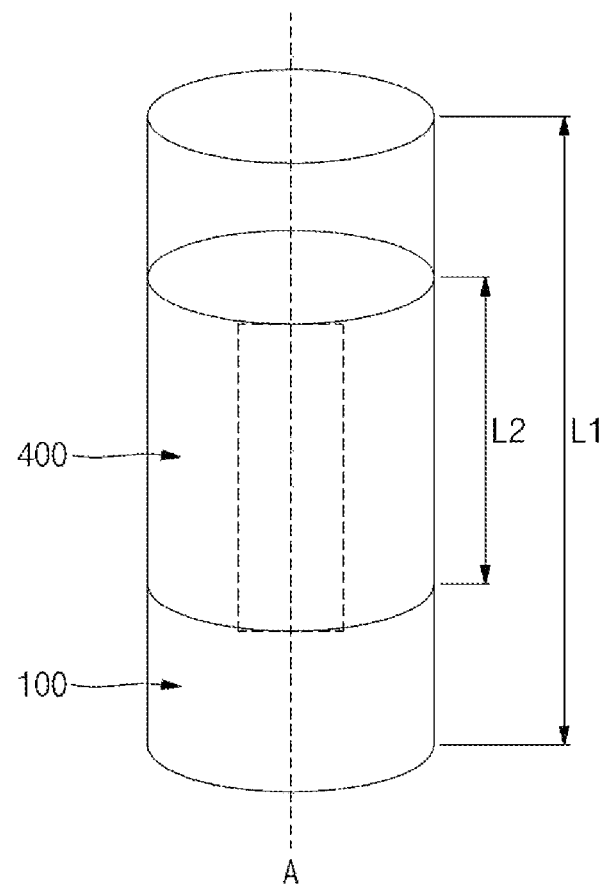
FIG. 3 is a perspective view schematically illustrating the electrode assembly according to FIG. 1.
Figure 4:
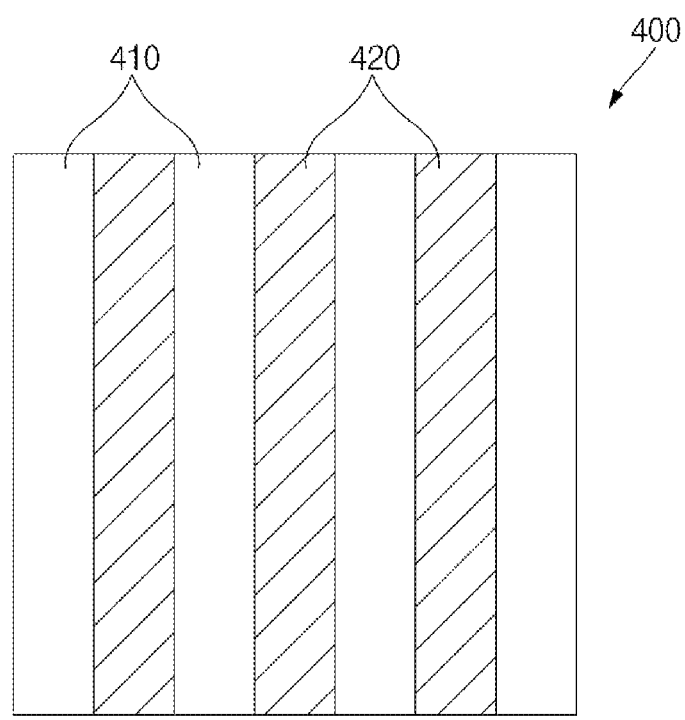
FIG. 4 is an enlarged plan view of one region of FIG. 3.
Figure 5:
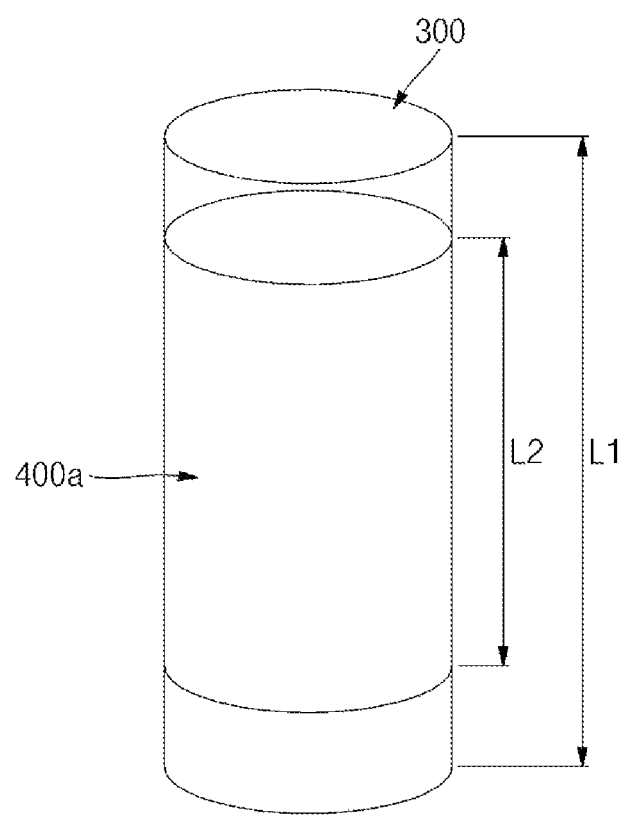
FIGS. 5 to 7 are perspective views schematically illustrating an attachment form of a finishing tape according to various embodiments of the present invention.
Figure 6:
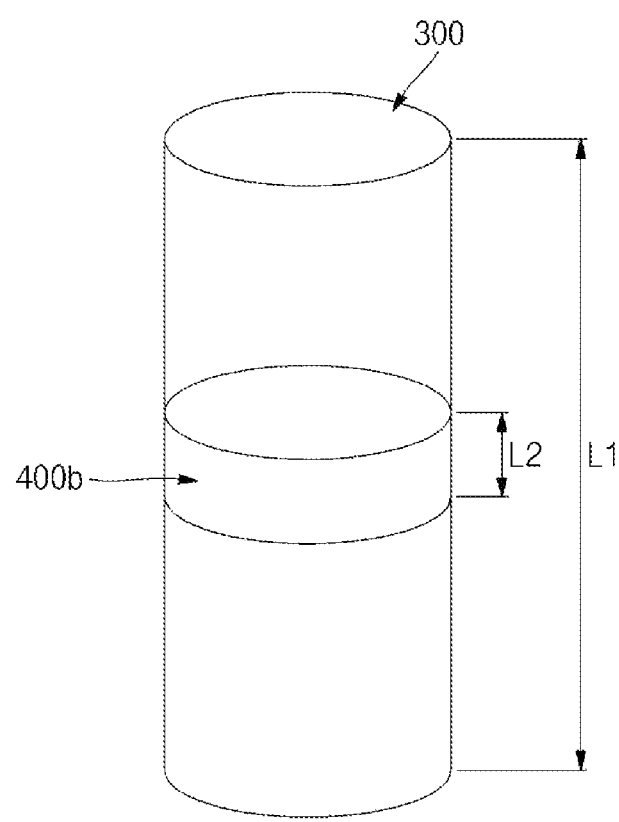
Figure 7:
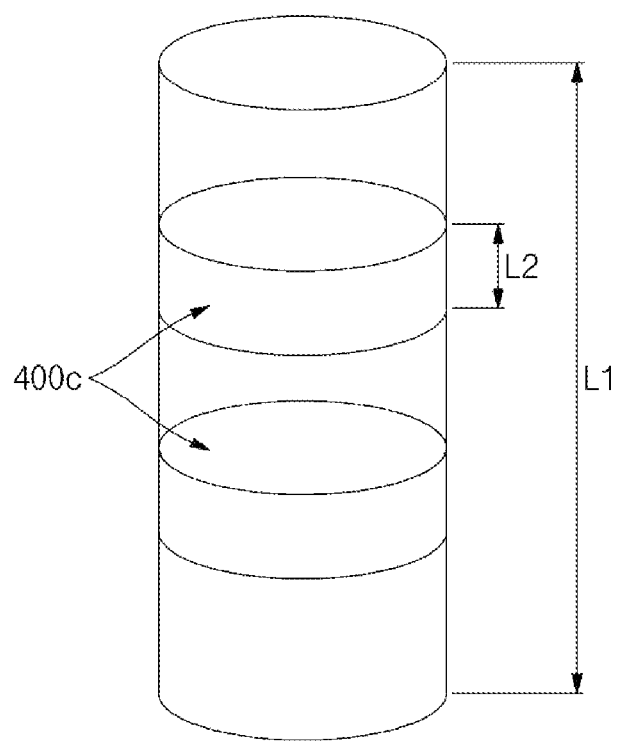

FIG. 2 is a plan view schematically illustrating an electrode assembly according to an embodiment of the present invention. FIG. 3 is a perspective view schematically illustrating the electrode assembly according to FIG. 1. FIG. 4 is an enlarged plan view of one region of FIG. 3. FIGS. 5 to 7 are perspective views schematically illustrating an attachment form of a finishing tape according to various embodiments of the present invention.

As shown in FIGS. 2 and 3, the electrode assembly 300 is wound in a cylindrical shape with the separator 330 interposed between the negative electrode plate 310 and the positive electrode plate 320. Assuming that a virtual central axis exists in the longitudinal direction of the electrode assembly 300, the central axis becomes a winding axis A. The electrode assembly 300 is fixed by the finishing tape 400 and is not unwound. For convenience, the winding start portion of the electrode assembly 300 is defined as the inner end of the electrode assembly 300, and the winding end portion is defined as the outer end portion. The finishing tape 400 is attached to cover a portion of the electrode assembly 300 in the direction of the winding axis and is attached to cover the outer peripheral surface of the electrode assembly 300. Accordingly, the finishing tape 400 may be formed in a rectangular shape and attached so as to be wound on the outer peripheral surface of the electrode assembly 300, or may be formed in a cylindrical shape to be inserted into the outer peripheral surface of the electrode assembly 300.

Assuming that the length of the electrode assembly 300 in the winding axis direction is L1, the length L2 of the finishing tape 400 based on the same direction may be 10 to 100% of L1. For example, as shown in FIG. 3, the length L2 of the finishing tape 400 may be about 60% of the length L1. In addition, as shown in FIG. 5, the length L2 of the finishing tape 400a may be about 80% of the length L1, and as shown in FIG. 6, the length L2 of the finishing tape 400b may be about 20% of L1. In addition, as shown in FIG. 7, a finishing tape 400c may include a plurality of tapes having a length of L2, which is about 20% of the length of L1, and attached to the electrode assembly 300. In this case, the finishing tapes 400c may be spaced apart from each other and attached adjacent to the negative electrode tab 340 and the positive electrode tab 350. Alternatively, the finishing tapes 400c may be disposed close to the middle part of L1.

In addition, as shown in FIG. 4, the finishing tape 400 may include a metallic region 410 and an adhesive region 420. The metallic region 410 may be made of the same or similar material as the electrode plate disposed on the outermost side of the last turn of the electrode assembly 300. For example, as shown in FIG. 1, the negative electrode tab 340 is in contact with the can 100 so that the can 100 has a negative polarity, and thus, in FIG. 2, the negative electrode plate 310 is disposed on the outermost side. Here, the metallic region 410 may be made of the same or similar material as that of the negative electrode plate 310. In this case, the metallic region 410 may be made of any one of copper, nickel, and an alloy material of copper and nickel.

The adhesive region 420 may be formed by applying, coating, or attaching an adhesive material on the metallic region 410. The adhesive region 420 may be made of a material having an adhesive property by reacting with the electrolyte within the operating temperature range of the secondary battery. For example, the adhesive region 420 may be made of an acrylic or PVdF-based binder material.

Here, the adhesive region 420 serves to fix the electrode assembly 300 so that the outer end of the electrode assembly 300 is not unwound while being wound. In addition, since the metallic region 410 is a metal material that is a conductor, it may contact the can 100 and serve as a substrate tab. That is, since the metallic region 410 is made of the same material as the negative electrode substrate, the can 100 and the negative electrode substrate of the negative electrode plate 310 may be electrically connected by the metallic region 410. That is, the metallic region 410 enables the movement of electrons, and thus may serve as a tab. When the electrode assembly 300 has a small diameter, the can 100 and the negative electrode substrate are not brought into contact with each other, and thus may not function as a tab. However, when the finishing tape 400 includes the metallic region 410, it is possible to overcome the problem of the negative electrode substrate not functioning as a substrate tab because the negative electrode substrate is not brought into contact with the can 100 according to the change in diameter.

The adhesive region 420 may be formed to have a predetermined gap on the metallic region 410. For example, as shown in FIG. 4, the adhesive region 420 may be formed on the metallic region 410 in the shape of a plurality of vertical lines having a predetermined width. Therefore, the finishing tape 400 may have a shape in which the metallic region 410 and the adhesive region 420 are alternately arranged. That is, in the metallic region 410, the shape of only a portion where the adhesive region 420 is not formed is exposed.

However, the arrangement of the metallic region 410 and the adhesive region 420 is not limited to the above-described embodiment.

Figure 8:
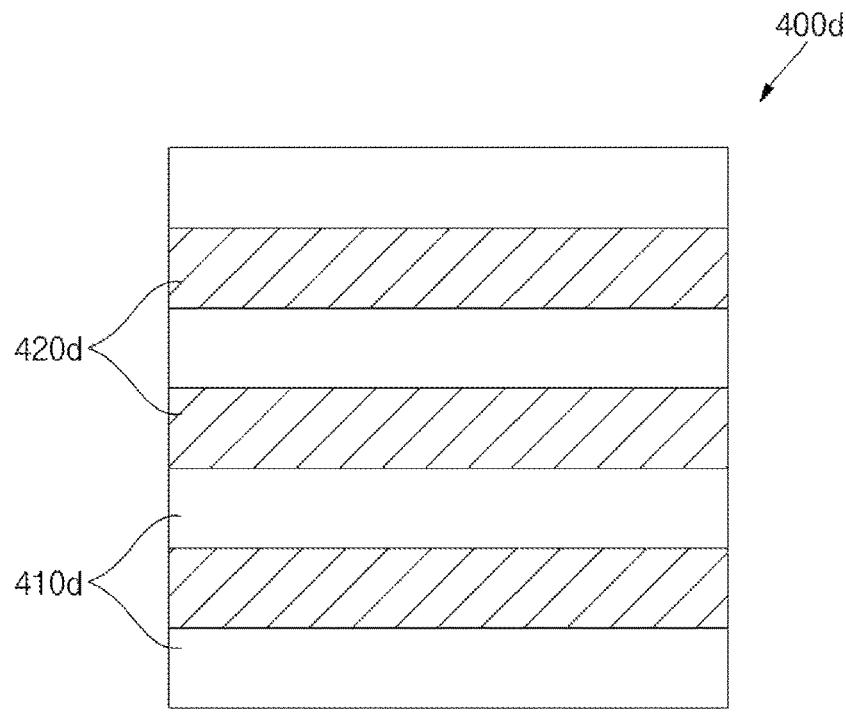
FIGS. 8 to 10 are plan views illustrating portions of finishing tapes according to various embodiments of the present invention.
Figure 9:
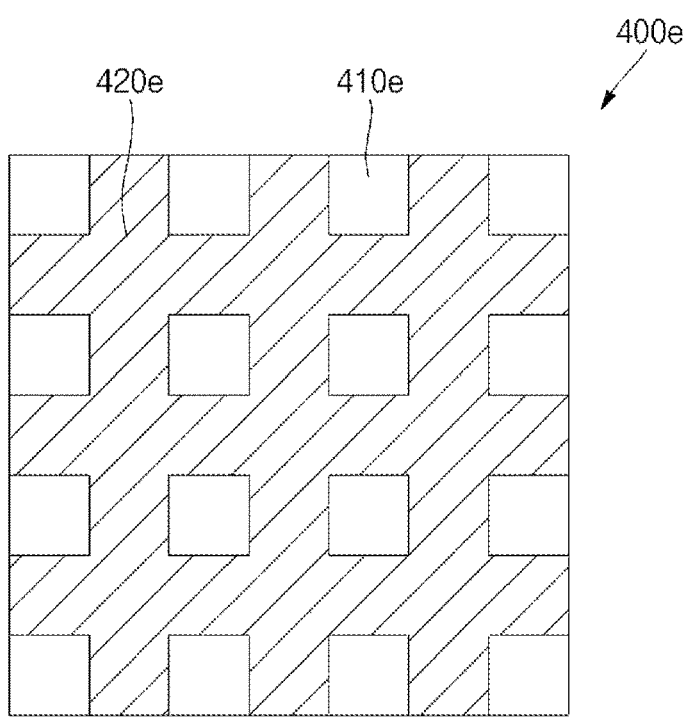
Figure 10:
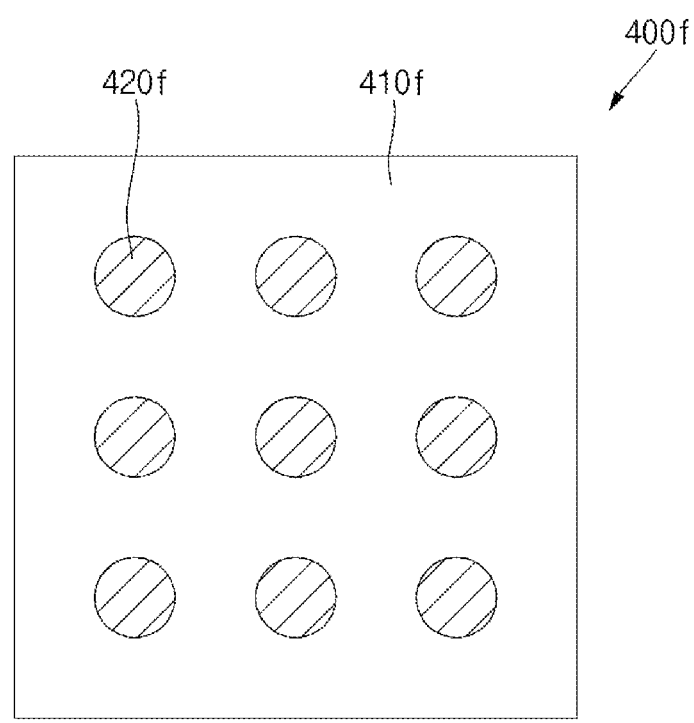

FIGS. 8 to 10 are plan views illustrating portions of finishing tapes according to various embodiments of the present invention.

As shown in FIG. 8, in a finishing tape 400d according to another embodiment of the present invention, an adhesive region 420d may be formed on a metallic region 410d in the shape of a plurality of horizontal lines having a predetermined width. Therefore, the finishing tape 400d may have a shape in which the metallic region 410d and the adhesive region 420d are alternately arranged.

In addition, as shown in FIG. 9, in a finishing tape 400e according to another embodiment of the present invention, an adhesive region 420e may be formed on a metallic region 410e in a lattice shape. Accordingly, the metallic region 410e may appear to be arranged on the adhesive region 420e in a plurality of rectangular shapes.

In addition, as shown in FIG. 10, in a finishing tape 400f according to another embodiment of the present invention, an adhesive region 420f may be formed on the metallic region 410f in the shape of a plurality of dots having a predetermined size. The adhesive region 420f may be arranged on the metallic region 410f at regular intervals.

However, the shapes of the finishing tapes 400d to 400f are not limited to those of the above-described embodiments.

As described above, by applying a metallic finishing tape to the winding finishing portion of the electrode assembly, there is an effect of improving dispersion of quality of the substrate finishing structure due to dispersion of a major axis. In addition, the metallic finishing tape serves as an additional end tab (substrate tab), thereby improving the dispersion of cell performance.

What has been described above is only one embodiment for carrying out the present invention, and the present invention is not limited to the above-described embodiment. However, the technical spirit of the present invention lies in that anyone skilled in the art could make various changes, as claimed in the claims below, without departing from the gist of the present invention.

The invention claimed is:

1. A cylindrical secondary battery comprising:
   an electrode assembly comprising a negative electrode plate, a positive electrode plate, and a separator interposed between the negative electrode plate and the positive electrode plate, and having a wound shape in one direction;
   a metallic finishing tape attached to an outer peripheral surface of the electrode assembly so as to cover at least a portion of the electrode assembly;
   a cylindrical can having one side opened so as to accommodate the electrode assembly along with an electrolyte; and
   a cap assembly coupled to the open one side of the can so as to seal the can,
   wherein the finishing tape comprises a metallic region and a plurality of adhesive regions spaced apart from each other with the metallic region therebetween.

2. The cylindrical secondary battery of claim 1, wherein the metallic region contacts one side of an inner peripheral surface of the can and the plurality of adhesive regions are on the metallic region and attached to the electrode assembly.

3. The cylindrical secondary battery of claim 1, wherein the plurality of adhesive regions comprise at least one of a vertical line, a horizontal line, a lattice, or a dot shape.

4. The cylindrical secondary battery of claim 1, wherein the finishing tape is attached to at least a part of an outer end of the electrode assembly, which is a winding finishing portion.

5. The cylindrical secondary battery of claim 1, wherein in the direction of a winding axis of the electrode assembly, a length (L2) of the finishing tape is 10 to 100% of a length (L1) of the electrode assembly.

6. The cylindrical secondary battery of claim 5, wherein the finishing tape includes a plurality of finishing tapes.

7. The cylindrical secondary battery of claim 1, wherein the metallic region is connected with an electrode plate from among the negative electrode plate and the positive electrode plate that is on an outermost side of a last turn of the electrode assembly.

8. The cylindrical secondary battery of claim 7, wherein the metallic region is made of the same material as the electrode plate on the outermost side of the last turn of the electrode assembly.

9. The cylindrical secondary battery of claim 1, wherein the negative electrode plate comprises an entirety of the outer peripheral surface of the electrode assembly.

10. The cylindrical secondary battery of claim 1, wherein the adhesive regions are made of a material having an adhesive property by reacting with the electrolyte.

11. The cylindrical secondary battery of claim 1, wherein the adhesive regions are made of an acrylic or PVdF-based binder material.

* * * * *